Patented Nov. 14, 1922.

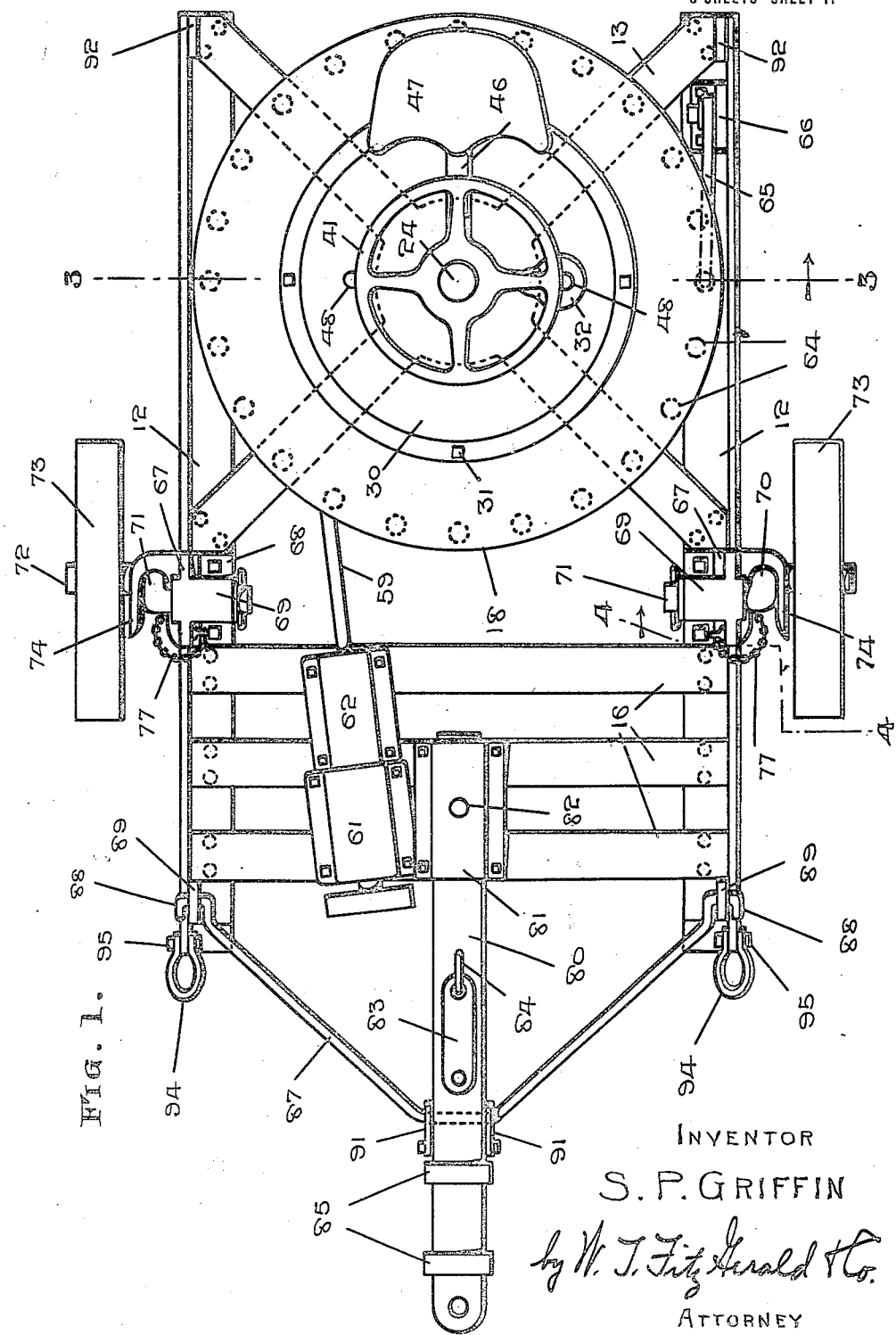

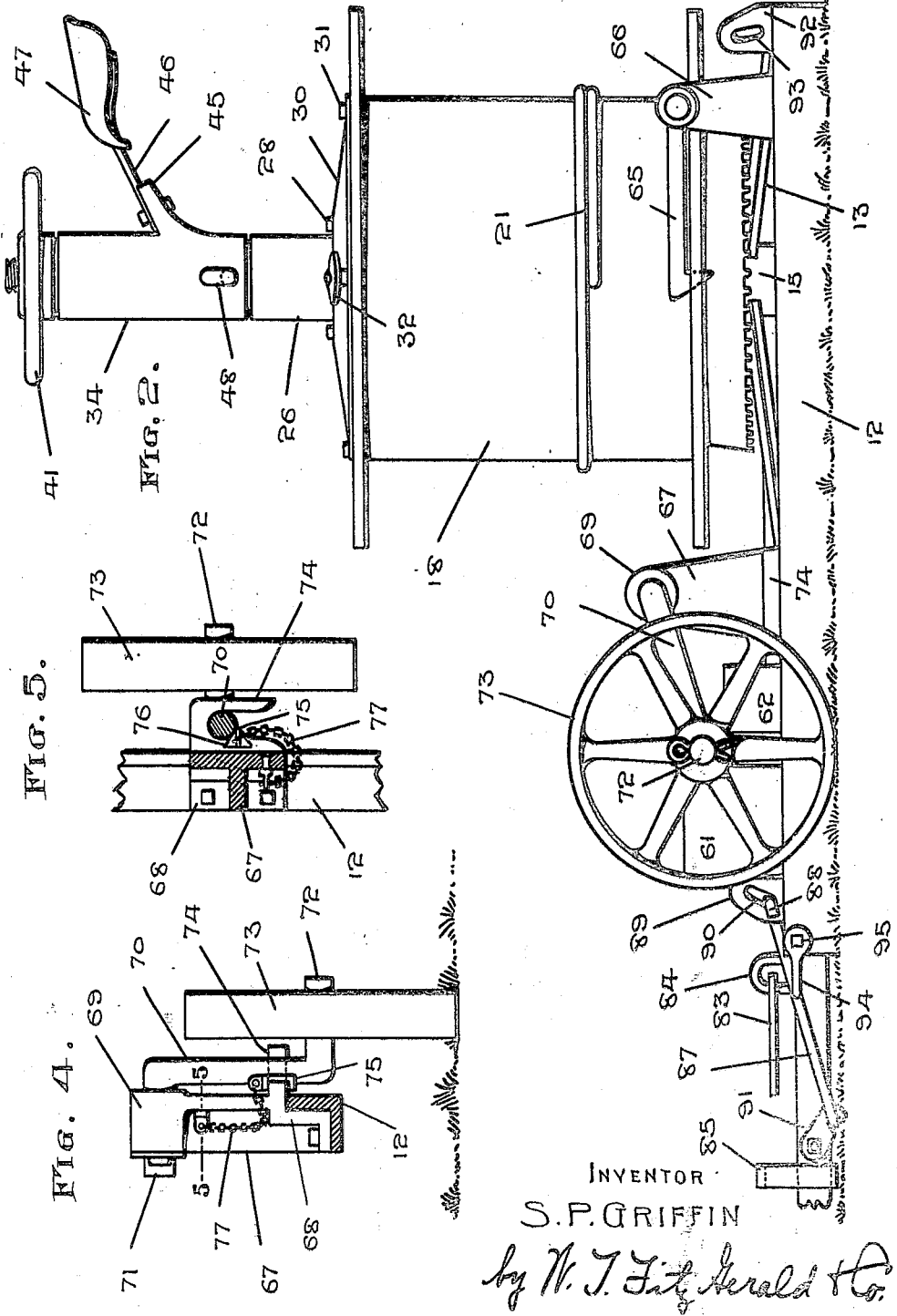

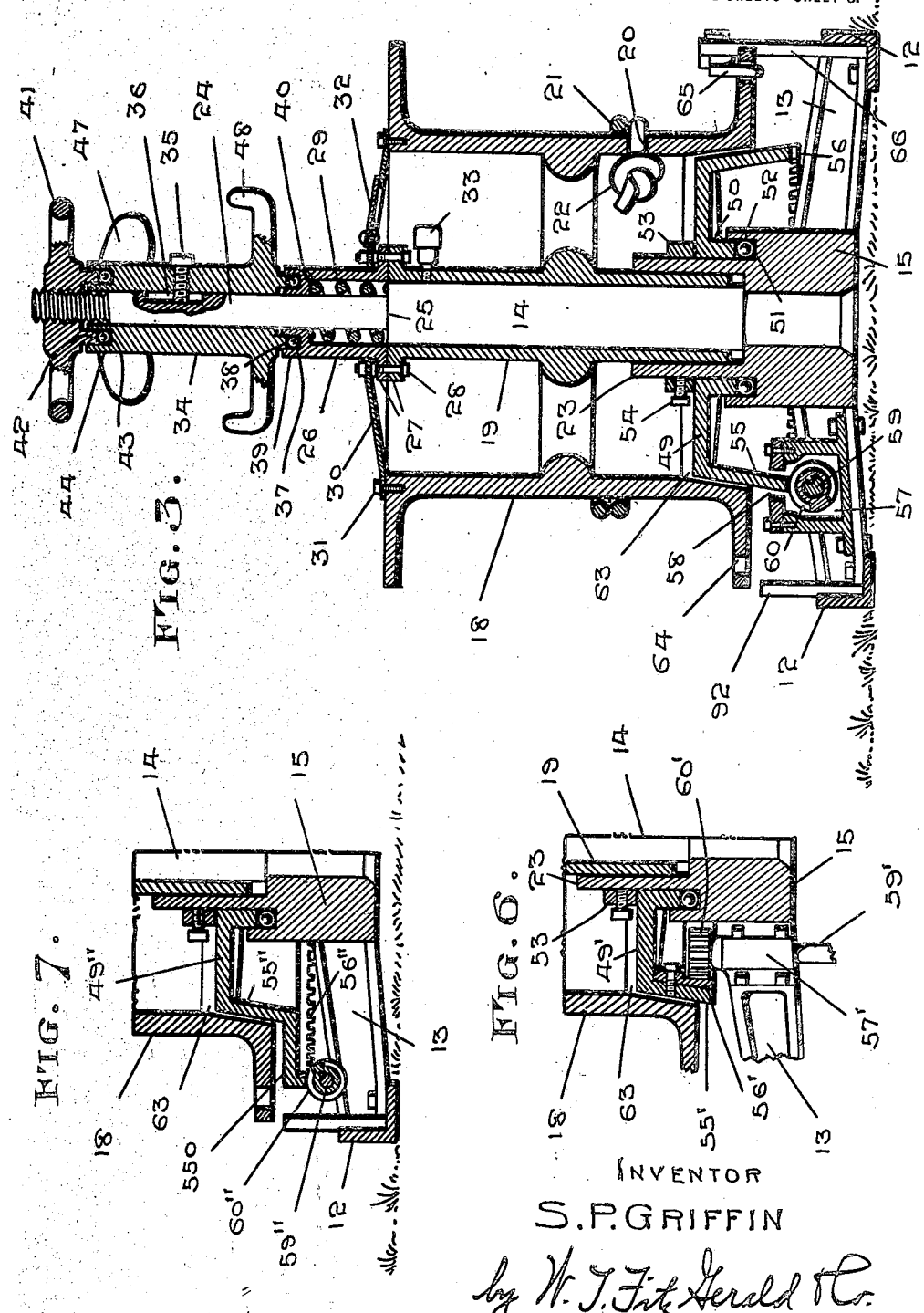

1,435,227

UNITED STATES PATENT OFFICE.

SAMUEL P. GRIFFIN, OF NORTH JUDSON, INDIANA.

CAPSTAN.

Application filed July 26, 1921. Serial No. 487,793.

*To all whom it may concern:*

Be it known that I, SAMUEL P. GRIFFIN, a citizen of the United States, residing at North Judson, in the county of Starke and State of Indiana, have invented certain new and useful Improvements in Capstans; and I do hereby declare the following to be a full, clear, and exact description of the invention, such will enable others skilled in the art to which it appertains to make and use the same.

The present invention relates to capstans, such as are used for moving buildings, pulling tree stumps, or otherwise exerting a pulling or lifting force, and this invention is an improvement over the capstan disclosed in my Patent No. 1,372,019, granted March 22, 1921.

An object of the invention is the provision of a novel arrangement of the drum or spool and rotary drum turning member, so that said member can be rotated by power, and means for bringing said drum and member into and out of connection, for the easy and rapid action of the capstan, without sticking, and providing for perfect control under varying loads.

Another object is the provision of novel controlling means for bringing the drum and operating member into and out of connection including means for accommodating and supporting the operator in a convenient manner for the efficient control of the device.

A further object is the provision of such a capstan having a novel construction and assemblage of the component elements, in order to enhance the utility and efficiency of the structure.

With the foregoing and other objects in view, which will be understood as the description proceeds, the invention resides in the construction and arrangement of parts hereinafter described and claimed, it being understood that changes can be made within the scope of what is claimed without departing from the spirit of the invention.

The invention is illustrated in the accompanying drawings, wherein—

Figure 1 is a plan view of the device showing the frame or base raised and supported on the wheels.

Fig. 2 is a side elevation with the frame or base lowered down on the ground.

Fig. 3 is a transverse section on the line 3—3 of Fig. 1, portions being shown in elevation.

Fig. 4 is a sectional detail on the line 4—4 of Fig. 1.

Fig. 5 is a sectional detail on the line 5—5 of Fig. 4.

Fig. 6 is sectional detail showing a modification in the means for driving the drum turning member.

Fig. 7 is a sectional detail showing another modification in the drum turning member and driving means therefor.

In carrying out the invention, there is provided a frame or base composed of parallel longitudinal angle iron side members or sills 12 and an X-shaped casting or member 13 having the terminals of its arms secured on the side members or sills 12. An upstanding spindle 14 is secured at its lower end to the central portion 15 of the member 13, and cross bars or beams 16 are secured to the members 12 near one end of the base, while the member 13 is located at the opposite end.

A horizontally-rotating drum or spool 18, having its axis arranged vertically, has its hub 19 mounted for rotation on the spindle 14. The drum 18 has an aperture 20 above its lower flange to receive one terminal of a cable or rope 21, which has a knot or clamp 22 within the drum, for anchoring said cable to the drum to the wound up thereon for moving a building, pulling a tree stump, or doing other similar work. The central portion 15 of the member 13 has an upstanding sleeve 23 receiving the lower end portion of the hub 19 for vertical movement of the drum, and said sleeve is adapted to hold oil for lubrication, and the sleeve also keeps out dust, dirt and foreign matter. The hub 19 can be babbitted to prevent injury to the spindle 14.

That portion of the spindle above the top of the drum is reduced, as at 24, forming a shoulder 25 at the upper end of the hub 19, and a sleeve 26 is disposed around said portion 24 of the spindle. The adjacent ends of the sleeve 26 and hub 19 have outstanding flanges 27 secured together by bolts 28. thereby fastening said sleeve and hub together, and a coiled expansion spring 29 is disposed within the sleeve 24 around the spindle and is confined between the shoulder 25 and the upper inturned end portion of the sleeve, said spring being of sufficient tension to raise the drum 18 and other parts supported therefrom.

The upper end of the drum is closed by a sheet metal cover 30 of annular form surrounding the sleeve 26, and having its inner edge secured in place by the bolts 28 and its outer edge fastened on the upper flange of the drum by means of screws 31, to keep out rain, snow and dirt from the drum. Said cover 30 has a hand hole 32 which can be opened for access to a lubricant cup 33 carried by the hub 19 for supplying lubricant between said hub and the spindle.

A non-rotating sleeve 34 is mounted slidably on the portion 24 of the spindle above the sleeve 26 which rotates with the drum, and said sleeve 34 carries a screw or feather member 35 entering a longitudinal slot 36 in the spindle to prevent said sleeve 34 from rotating, and permit it to slide up and down. The lower end of the sleeve 34 has an annular rib 38 to enter an annular groove 37 in the upper end of the sleeve 26, which groove can contain oil for lubrication, and anti-friction balls 39 can also be disposed in said groove, if desired, for reducing friction between the sleeves. The sleeve 26 has an oil hole 40 to inject oil.

A hand wheel or nut member 41 is threaded on the upper terminal of the spindle above the sleeve 34 and has a connection with the upper end of the sleeve similar to the connection between the sleeves 26 and 34. Thus, the upper end of the sleeve 34 has an annular groove 43 to hold lubricant, and the wheel 41 has a lower annular rib 42 to turn in said groove and anti-frictional balls 44 can also be disposed in said groove.

The sleeve 34 is elongated vertically, so as to be provided with means for supporting the operator. Thus, said sleeve 34 has an extension 45 on which is secured a bar 46 supporting a seat 47 for the operator, and foot rests 48 are also carried by the sleeve 34 at opposite sides, in order that the operator can place his feet on said foot rests when turning the hand wheel 41. This enables the operator to conveniently and efficiently control the device while seated above the drum, and the spring 29 is of sufficient strength to raise the drum, operator and other parts which move up and down with the drum.

The drum turning member is located at the lower end or bottom of the drum, and includes a wheel 49 located within the lower end portion of the drum and having a hub 50 mounted for rotation around the sleeve 23 and turning in an annular groove 51 formed in the central portion 15 of the member 13 around said sleeve to hold lubricant and also antifriction balls 52 if desired for the free turning movement of the wheel 49. A collar 53 is fitted on the sleeve 23 above the wheel 49, to retain said wheel in place, and said collar is secured to the sleeve by means of a set screw 54 or the like. The wheel or member 49 has a downturned rim 55 which is conical or tapered upwardly, and which has worm teeth 56 at its lower edge.

The driving means for the wheel or member 49 includes a case 57 supported by the arms of the member 13 at one side of the central portion 15 and having an upper slot 58 through which the rim 55 moves, and a worm 60 is disposed in said case and is secured on a drive shaft 59, whereby said shaft in turning will rotate the wheel or member 49. An engine or motor 61 of any suitable kind is mounted on the cross bars 16, which serve as a base for the motor, and the transmission gearing 62 from which the shaft 59 extends.

The lower end portion of the drum 18 is internally tapered, as at 63, to fit tightly down on and around the clutch rim 55 of the wheel or member 49 when the drum is moved downwardly, thereby providing a friction clutch connection between said wheel and drum. By turning the hand wheel 41 to force the sleeves 34 and 26 downwardly, this will force the drum down against the tension of the spring 29, to cause the clutch portion 63 of the drum to grip the clutch rim 55 of the drum turning wheel or member 49, so that the drum is rotated with said wheel. By rotating the hand wheel 41 in the opposite direction, this will enable the spring 29 to come into play for raising the drum and allowing it to slip with respect to the wheel 49. It is therefore a convenient matter to cause the drum to rotate with the wheel 49, or to lessen the speed of the drum by allowing a certain amount of slippage between the drum and wheel 49, or the drum can be released so as to rotate reversely by the unwinding of the cable therefrom. The operator thus has perfect control of the drum and the wheel 49 can rotate continually at uniform speed. When the wheel 49 is still, the drum 18 can be raised or lowered to vary the friction between the drum and wheel 49, to control the rotation of the drum when the cable is unwound therefrom, such as when an object is being lowered or moved down a hill.

In order to prevent the reverse rotation of the drum, the lower flange thereof has an annular series of apertures 64, in which a hook-shaped pawl or dog 65 is engageable, said pawl or dog being pivoted to a bracket 66 secured to one of the members or sills 12. Said pawl or dog will be raised out of the apertures by the turning movement of the drum (counter clock-wise in Fig. 1) and drops into the apertures in succession, so that when the drum is released, it will not turn to permit the cable to unwind.

The frame or base is wheel-mounted in order that it can be conveniently moved about, and let down onto the ground where the capstan is to be used. For this purpose, a pedestal or standard 67 is provided at each side of the base, and its lower end is formed, as at 68, to fit the corresponding angle iron member 12 between the ends thereof and is secured thereto in any suitable manner. The pedestals have the bearings 69 at their upper ends, and crank members 70 are disposed at the outer sides of said pedestals and have the angularly-extending journal portions 71 at their upper ends extending through the bearings 69, while said crank members have angularly-extending spindles 72 at their lower ends on which the wheels 73 are mounted. The members can therefore swing about a transverse axis for raising and lowering the frame or base, and said members when swung downwardly and upwardly will lower and raise the base respectively. The pedestals are located at such points between the ends of the base, as to balance the structure when supported on the wheels. Each pedestal has a hook-shaped seat 74 at its outer side arranged to receive the corresponding member 70 when it is swung to raise the frame or base, and said seat serves to limit the movement of said member when swung beyond a vertical position or dead-center with the axis of the wheel 73 moved slightly past the vertical plane of the journal portion 71. Pegs 75 of triangular section are adapted to be fitted down in dovetailed grooves 76 in the seats 74 when the members 70 are seated in said seats, as seen in Figs. 4 and 5, whereby to retain said members 70 in place. Said pegs 75 are suspended by chains or flexible elements 77 which are anchored to the pedestals 67 on the inner sides thereof, so that when said pegs are withdrawn, they can fall or drop on the inner sides of the members 12 out of the way of the members 70 when raising or lowering the frame or base. The pegs 75 can be readily inserted into the grooves 76 when the members 70 have been swung to raise the frame, thereby preventing the accidental movement of the members 70 out of the seats 74 while the device is being moved about on the wheels.

The device is pulled from one place to another by means of a stub tongue 80, the rear end of which is slipped into a socket 81 secured on the cross bars 16 and held in said socket by means of a pin or bolt 82. A link 83 for the connection of a double-tree is loosely connected on the tongue, as at 84, for hitching draft animals to the device, although the tongue 80 can be coupled to a tractor. Socket members 85 are secured on the tongue at the forward end thereof for receiving an extension tongue when draft animals are used for hauling the device.

A V-shaped pull rod or bail 87 is provided for attachment to either end of the frame or base, and has the outturned hooks 88 at its ends to engage ears 89 secured to the members 12 at the forward end of the frame and provided with inclined slots 90 for the engagement of said hooks. The slots 90 are inclined away from said end of the frame, so that the rod or bail 87 must be brought to a similarly inclined position for inserting the hooks 88 outwardly through or withdrawing them inwardly from said slots when applying the rod to or detaching same from the frame. When the hooks are sprung outwardly through the slots 90 and the rod swung forwardly away from the frame, the rod is locked to the frame for upward and downward swinging movement about a transverse axis, and cannot be detached unless it is swung to the same angle of inclination as the slots 90. When using the tongue 80, the rod or bail 87 can be swung upwardly against said tongue, and fastened by hooks 91 pivoted to the sides of the tongue, so that said rod or bail will serve as a bound between the tongue and frame.

The rear arms of the member 13 have upstanding ears 92 at the rear end of the frame with slots 93 similar to the slots 90, for the engagement of the rod or bail 87, so that said rod can be applied to either end of the frame for pulling said frame in either direction. The slotted ears 89 and 92 can also be used for the attachment of the cable or rope, when pulling tree stumps or the like. Clevises 94 are pivoted, as at 95, on the forward ends of the members 12 for hitching the frame to animals or a tractor, and said clevises also serve as stake sockets for driving stakes downwardly into the ground and anchoring the frame to the ground.

As shown in Fig. 6, the wheel or member 49′ has an internal gear 56′ secured to the rim 55′ thereof for the engagement of pinion 60′ secured to the upper end of a vertical shaft 59′ journaled through a bearing 57′ secured to the member 13. This enables said wheel 49′ to be driven from below.

Fig. 7 shows the rim 55″ of the wheel 49″ having an extension or flange 550 with the worm teeth 56″ to engage the worm 60″ on the shaft 59″, thereby obtaining greater leverage than with the arrangement as shown in Fig. 3.

Having thus described the invention, what is claimed as new is:—

1. A capstan comprising a frame having an upstanding spindle, a drum rotatable and slidable on said spindle, a drum turning wheel rotatable on the spindle below the drum, the lower portion of the drum and said wheel having tapered clutch portions to frictionally engage one another when the drum is lowered, means for rotating said wheel, a sleeve slidable on the spindle above the drum and connected to the drum for raising and lowering it, means carried by said sleeve for supporting an operator to force the clutch portions into tight engagement when the drum is lowered, and a nut screw-threaded on the spindle to raise and lower said sleeve to be turned by the operator.

2. A capstan comprising a frame having an upstanding spindle and an upstanding sleeve surrounding the lower portion of the spindle, a drum having a hub fitted on the spindle with its lower end fitted within said sleeve, a drum turning wheel rotatable around said sleeve and supported by the frame, said wheel being located within the lower portion of the drum, and said wheel and drum having clutch portions to engage one another, means for rotating said wheel, and means for raising and lowering the drum on the spindle.

3. A capstan comprising a frame having an upstanding spindle, a drum rotatable and slidable on the spindle, a drum turning wheel rotatable on the spindle within and surrounded by the lower portion of the drum and having a depending rim, the lower portion of the drum and said rim being formed to engage one another when the drum is lowered, means for raising and lowering the drum on the spindle, and a driving member for turning said wheel, the lower edge portion of said rim having means for engaging said driving member.

4. A capstan comprising a frame having an upstanding spindle and an upstanding sleeve surrounding the lower portion of the spindle, a drum having a hub fitted on said spindle with its lower end fitted within said sleeve, a drum turning member rotatable around said sleeve, said member and drum having clutch portions to frictionally engage one another, and means for moving said drum and member into and out of engagement.

In testimony whereof I have signed my name to this specification in the presence of two subscribing witnesses.

SAMUEL P. GRIFFIN.

Witnesses.
CHARLES W. WENINGER,
JOHN HORSLEY.